Patented Aug. 10, 1943

2,326,729

UNITED STATES PATENT OFFICE 2,326,729

CERAMICS

John W. Whittemore, Blacksburg, and Charles R. Oberfell, Lynchburg, Va., assignors to The Mead Corporation, Chillicothe, Ohio, a corporation of Ohio No Drawing. Application March 15, 1938, Serial No. 195,994

9 Claims. (Cl. 106—72)

This invention relates to the production of articles from clays, and like earth materials; and, one of the principal objects of the invention is to provide for the processing of such earth materials to produce articles therefrom of quite superior and novel characteristics.

Another object is to provide such processing of the clay, or the like earth material, that the articles in the "green" condition have very superior characteristics which greatly increase the yield in manufacture.

Still another object is to provide such processing that the articles when fired to final form are of quite superior strength, uniformity, and surface characteristics.

Other objects and advantages will be apparent from the description and the appended claims.

This application is a continuation in part of copending application Serial Number 4,870 filed February 4, 1935, now abandoned.

In the ordinary process for the manufacture of clay products, the clay, of the proper state of fineness, etc., is mixed with a quantity of water to give the desired plasticity and workability and is then molded, or worked into the desired shape or form. The formed article is then usually dried to a condition of strength which permits of the further handling during the remaining steps in manufacture. In this state the partially dried article is said to be in the "green" condition, and it is thereafter subjected to firing or burning at relatively high temperature in a kiln.

Heretofore it has been universally accepted that considerable loss and waste of material would occur in the course of the manufacture or processing, so that to produce the desired number of acceptable finished articles it was necessary to suffer quite large losses of objects during manufacture. These losses arose partly during the firing operation; but in addition, quite large losses have also been attributable to results arising while the articles were in the green state or being dried to that condition. Generally, quite evident cracks appear in a considerable percentage of the formed articles during the process of drying making them useless even though they should not disintegrate before or during firing. Also many less evident cracks would appear during drying which would render the fired articles unacceptable—because of inferior appearance, strength, etc. There has also been large loss during handling of the wet formed or green articles necessary in the subsequent processing and much loss is occasioned by the fact that the green articles have not had the necessary strength and that many defects have appeared therein during this necessary handling which caused future rejection. For example, in one case in actual commercial manufacture of building brick—the formed wet brick are placed upon drying platforms. After drying to the green state these brick are removed from the platforms, placed in the kiln and fired. The percentage of brick which develops cracks during drying so as to make them break up during handling into the kiln or make them fatally defective in strength, etc., has been such that in order to secure 480 good brick from each platform it was necessary to put 512 wet brick thereon.

In order therefore to produce a given quantity of satisfactory salable articles, it is necessary to provide for and add not only the additional number of pieces which will probably be rejected as a result of shrinkage, cracking, etc. during firing, but also a proportionately greater number of articles must be originally prepared to replace breakage, etc., occurring in the green state. The present invention provides a simple processing which gives characteristics of strength, etc., to the clay in its green state, which result in very superior results at the end of the fired state, and is therefore extremely important from a commercial viewpoint because of reducing the amount of wastage and increasing the proportion of salable articles from a given quantity of clay; and also because the accepted articles are themselves of increased strength, etc. Therefore there is important advantage in two respects, namely, in decreasing losses, and in making the final product suitable for uses for which the ordinary clay articles having low strength properties would not be usable.

According to the present invention both of these objects are attained to a remarkable degree and it is possible to greatly increase the strength, uniformity and desirable surface characteristics of clay products, both in the green and in the fired states. The increase in strength is almost unbelievably large, in some cases the strength of the ultimate product being increased many times.

To secure this marked improvement in the interim and final characteristics, the clay in the wet plastic state is processed by adding thereto a predetermined relatively small quantity of an additive material containing a vegetable extract having the extraordinary capacity of imparting these astonishing improvements. In the wet plastic state the clay contains in the neighborhood of approximately 20% to 30% moisture, depending upon the various characteristics of the clay itself, and is distinguished from the suspension or flowable slurry or slip condition such as is customary to be used in connection with the casting of ware. Very superior and satisfactory results in operation have been secured by adding to the clay in such wet plastic state small controlled amounts of the product known as "chestnut extract," a product extracted from chestnut wood by leaching of chestnut wood chips. This product is well known and is available in considerable quantities at low cost, both in the dry and in the liquid form. It is a water soluble organic electrolyte obtained as a byproduct of the paper industry, a typical analysis of the dry extract being as follows:

|  | Per cent |
|---|---|
| Moisture | 5.99 |
| Total solids | 94.01 |
| Soluble solids | 92.64 |
| Insolubles | 1.34 |
| Non-tannins | 25.99 |
| Tannins | 66.65 |
| Purity | 74.91 |

This extract is sold on the basis of its "tannin" content, the dry extract containing 65% tannin and the liquid extract being distributed on the basis of containing 25% tannin, according to the testing method of the American Leather Chemists Association. This method of testing is merely empirical, and represents the proportion of the extract which is absorbed by hide powder.

The highly complex organic structures of the various organic materials contained in chestnut extract, and the fact that many of these organic materials are apparently unstable compounds, has so far made it impossible to separate these various compounds, and to determine in exactly what form they are present. It is known however that this extract does contain tannin materials of the pyrogallol type and it is believed the presence of such materials is desirable in producing the remarkable results of this invention.

Also, these remarkable increases in strength, etc., characteristics of the products are furthered quite materially by the addition of a predetermined small quantity of sodium chloride, a metallic salt. As with the case of the extract alone, there is a critical range of proportions which produces the markedly superior and extra-desirable results, and the addition of a quantity of sodium chloride outside that critical range results in disproportionately diminishing the advantageous results. But the proper additional quantities will impart amazing strength characteristics to the product. The sodium chloride may suitably be a good commercial grade of salt.

The exact quantity of both the extract and the sodium chloride will of course, vary somewhat with the character of the clay being used. For instance, clays vary materially in organic content, in quantity of water required to produce a workable mix, in plasticity as well as in numerous other physical characteristics. A controlled small quantity of the extract, preferably including the desired proportion of salt therein, is added to the clay prior to or while in the wet plastic condition during the processing. This proportion is so controlled with respect to a critical maximum value, as to bring about a flocculating action in the clay, resulting in making the clay more easily handled and more readily worked. The flocculating effect tends to coagulate the particles causing more continuous capillaries from the interior to the exterior of the mass, and this action facilitates the dispelling of occluded air and other gases that may be adsorbed on the surface of the particles. It also facilitates the dispersion of the water from the interior to the exterior in the drying of the ware, which makes for easier and safer drying than when the clay is in a deflocculated condition and the capillaries are not as continuous in their arrangement from the interior of the piece to the surface. The flocculating action also has the effect of compacting the particles more closely together and of effecting more intimate interlocking thereof providing greater molecular attraction. In the fired state a glassy matrix is developed which gives superior adhesion, the glass forming more readily where the surfaces of the particles are in intimate contact, resulting in further improved strength. The density of the clay also increases in the flocculated condition and less water is required to wet the clay to the wet plastic condition, such for instance that it will take an impression of the thumb. The reduced water content is also desirable as resulting in less drying and shrinking and such coagulation of the particles as results from flocculation also tends to eliminate unequal shrinkage with consequent reduction in local strains.

A proportion range which has been found to produce very satisfactory results is of the order of .1% to .25% of the dry extract material, or a proportionate amount of the liquid extract having the same quantity of tannin material, based on the dry weight of the clay. A maximum proportionate improvement in the characteristics of the ware was secured with such small added quantities of extract material, increase substantially beyond such range appearing to have less flocculating effect, and in some cases resulting in deflocculation with resultant reduction in the ease and safety of drying. It is important in adding such small quantities of additive material that proper and homogeneous distribution thereof be secured throughout the plastic clay mass so that the additive material will be distributed and made effective uniformly throughout the entire mass. For this purpose the plastic clay mass is therefore carefully worked at the time of the addition of the extract in suitable apparatus such as a pug mill, for sufficient length of time following addition of the extract to secure the desired uniformity of distribution.

The salt to be incorporated with the extract material is conveniently made up in solution with the liquid extract, and the extract with the salt then incorporated with the wet plastic clay mass. The proportion of salt used with the extract may be varied from none at all to approximately equal or even somewhat greater quantities than the extract. As the quantity of salt is increased, the fired bricks show some tendency to become glazed or fused on their surface, the salt when present in sufficient amount acting as a fluxing agent; accordingly the quantity of salt to be utilized is preferably limited to avoid the development of such fused condition. In commercial practice applicants have found it desirable to make up a mixture of tannin extract and salt in which the salt is present in approximately the proportion range of 20% to 40% by weight; though these proportions are not critical, it is found that for most purposes this, or approximately this proportion range will give satisfactory results for widely varying types of clays, and that variation may, then be made in the quantity of the mixture of such materials which is incorporated in each case with the clay. The use of salt, is further desirable in conjunction with the chestnut extract as providing for the securing of improved strength and other characteristics, inasmuch as the salt is less expensive than the extract, and a less expensive additive mixture having the increased effectiveness above described, even in the very small quantity range as indicated is thereby obtained.

The following is a specific example showing the results obtained by the practicing of the present invention using a Virginia clay of secondary or alluvial deposit having a high content of fine grained free silica, and a low content of organic matter. It was found that the modulus of rupture of a natural clay of this character was 65 pounds per square inch when in the green state. The same clay in the fired condition had a modulus of rupture of 200 pounds per square inch. The addition to this clay of the mixture comprising 75% chestnut extract and 25% sodium chloride as above described, and in an amount corresponding to .2% of dry extract on the weight of the clay, resulted in flocculating the clay and in an increase of the green dry modulus of rupture from 65 to 145 pounds per square inch, and in an increase of the fired strength from 200 to approximately 952 pounds per square inch. When 2% of the mixture was added, deflocculation of the clay particles occurred and the resulting formed products were of impaired strength and other properties.

As another specific example, using a refractory clay, the clay in its natural state had a green modulus of rupture of 231 pounds per square inch, and a fired modulus of rupture of 619 pounds per square inch. This clay was made down to a wet plastic condition containing approximately .18% moisture, and .25% dry chestnut extract added thereto. This resulted in an increase in the green dry strength to 285 pounds per square inch, and in the fired strength to 735 pounds per square inch.

As another example, a fine grained highly plastic clay suitable for the manufacture of saggers, the fired color of which was cream, was utilized. This clay had a green modulus of rupteure of 315 pounds per square inch and a fired modulus of rupture of 2608 pounds per square inch. The addition to this clay of the mixture of chestnut extract and sodium chloride as above described in an amount corresponding to .125% dry tannin equivalent resulted in increasing the green modulus of rupture to approximately 470 pounds per square inch and the fired modulus of rupture to approximately 2960 pounds per square inch.

It is quite remarkable that these astonishing results in increase of the finished characteristics and the strength of the finished product are best obtained with the addition of only a very small quantity of the additive material within the percentage range indicated. Consequently the invention is highly important in the field of ceramics since these highly desirable characteristics are obtained with only a very small additional cost.

While the method and article herein described constitute preferred embodiments of the invention, it is to be understood that the invention is not limited to this precise method and product, and that changes may be made therein without departing from the scope of the invention which is defined in the appended claims.

What is claimed is:

1. The method of increasing the strength of clay material which comprises adding thereto while in a wet plastic state containing approximately 20% to 30% moisture a small controlled quantity of the order of .1% to .25% of an additive material in an amount such as to bring about a flocculating condition of particles of clay, said additive material comprising a mixture containing a major proportion of chestnut extract as an essential ingredient and of the order of 20% to 40% common salt.

2. A clay product of the character described having greatly increased strength characteristics in both the green and the fired condition comprising clay material having an acid-reacting additive material uniformly incorporated and distributed therethrough while in a wet plastic condition in an amount of the order of .1% to .25% of the dry weight of the clay to effect flocculation thereof, said additive material including chestnut extract as an essential ingredient.

3. A clay product of the character described having greatly increased strength characteristics in both the green and the fired condition comprising clay material having an additive material uniformly incorporated and distributed therethrough while in a wet plastic condition containing of the order of 20% to 30% moisture in an amount of the order of .1% to .25% of the dry weight of the clay to effect flocculation of the clay particles, said additive material comprising a mixture containing a major proportion of chestnut extract and of the order of 20% to 40% common salt.

4. A clay product of the character described having greatly increased strength characteristics in both the green and the fired condition comprising clay material in a wet plastic condition having its particles in a flocculated condition with an acid-reacting additive material comprising chestnut extract as an essential ingredient uniformly incorporated and distributed therethrough in an amount of the order of .1% to .25% of the dry weight of the clay, said clay upon drying being in compact and dense condition with the clay particles interlocked in intimate relation providing for the development of a glassy matrix upon firing.

5. The method of providing a clay product having increased strength which comprises adding to the clay and thoroughly incorporating therewith while in a wet plastic condition containing approximately 20% to 30% moisture a controlled quantity of an acid-reacting additive material containing chestnut extract as an essential ingredient in an amount not exceeding a critical maximum value up to approximately .25% based on the dry weight of the clay to secure a flocculating action of the clay particles in which dispersion of water and dispelling of occluded gases from the interior of the product is facilitated, and drying the clay product to provide a dense product in which the particles are in compact and intimately interlocked relation such that a glass matrix is developed upon firing.

6. The method of producing a molded clay product of the character described having increased strength in both the green and fired states which comprises placing the clay in a wet plastic condition containing approximately 20% to 30% moisture, then causing a flocculation of the clay particles with resultant coagulation thereof to form substantially continuous capillary passages from the interior to the exterior of the molded mass by incorporating and homogeneously distributing through the mass while in a said wet plastic state up to a critical maximum value of approximately .25% of an acid-reacting additive material containing chestnut extract as an essential ingredient, and thereafter forming and drying the molded clay product to provide a dense product in which the particles are in compact and intimately interlocked relation such that a glassy matrix is developed upon firing.

7. The method as defined in claim 6 in which the additive material contains, in addition to said chestnut extract, approximately 20% to 40% common salt.

8. A clay composition of the character described adapted for use in molding to produce a product having increased strength characteristics in both the green and fired conditions comprising clay material in a wet plastic state having its particles coagulated and forming substantially continuous capillary passages from the interior to the exterior of the mass by flocculation with an additive material, said additive material comprising up to a critical maximum value of .25% and containing chestnut extract as an essential ingredient, said clay product upon drying being in compact and dense condition with the clay particles interlocked in intimate relation providing for the development of a glassy matrix upon firing.

9. A product as defined in claim 8 in which said additive material contains in addition to said chestnut extract, approximately 20% to 40% common salt.

JOHN W. WHITTEMORE.
CHARLES R. OBERFELL.

CERTIFICATE OF CORRECTION.

Patent No. 2,326,729.                          August 10, 1943.

JOHN W. WHITTEMORE, ET AL.

It is hereby certified that error appears in the printed specification of the above numbered patent requiring correction as follows: Page 3, first column, line 45, for ".18%" read --18.%--; line 54, for "rupteure" read --rupture--; and second column, lines 47-48, for "threethrough" read --therethrough--; and that the said Letters Patent should be read with this correction therein that the same may conform to the record of the case in the Patent Office.

Signed and sealed this 7th day of September, A. D. 1943.

(Seal)                                         Henry Van Arsdale,
                                            Acting Commissioner of Patents.